(12) United States Patent
Boas

(10) Patent No.: US 10,124,848 B2
(45) Date of Patent: Nov. 13, 2018

(54) FASTENING AND/OR LOCKING SYSTEM

(71) Applicant: ORTLIEB SPORTARTIKEL GMBH, Heilsbronn (DE)

(72) Inventor: Günther Boas, Heilsbronn (DE)

(73) Assignee: ORTLIEB SPORTARTIKEL GMBH, Heilsbronn (DE)

( * ) Notice: Subject to any disclaimer, the term of this patent is extended or adjusted under 35 U.S.C. 154(b) by 24 days.

(21) Appl. No.: 15/525,302

(22) PCT Filed: Nov. 19, 2015

(86) PCT No.: PCT/DE2015/000550
§ 371 (c)(1),
(2) Date: May 9, 2017

(87) PCT Pub. No.: WO2016/078635
PCT Pub. Date: May 26, 2016

(65) Prior Publication Data
US 2017/0361887 A1    Dec. 21, 2017

(30) Foreign Application Priority Data

Nov. 22, 2014 (DE) .................... 20 2014 009 305 U

(51) Int. Cl.
*B62J 7/02* (2006.01)
*B62J 7/08* (2006.01)
(Continued)

(52) U.S. Cl.
CPC ................ *B62J 7/08* (2013.01); *A45C 13/10* (2013.01); *F16B 2/12* (2013.01); *Y10T 24/1391* (2015.01); *Y10T 24/4522* (2015.01)

(58) Field of Classification Search
CPC . B62J 9/00; B62J 7/08; Y10T 24/4775; Y10T 24/45791; Y10T 24/45775;
(Continued)

(56) References Cited

U.S. PATENT DOCUMENTS 5,730,342 A * 3/1998 Tien .......................... A45F 5/02
                                                                 224/197
5,839,173 A * 11/1998 Otrusina ................... A45F 5/02
                                                                  24/3.1
(Continued)

FOREIGN PATENT DOCUMENTS

DE         4424943       9/1995
DE     202010004309      7/2010
(Continued)

OTHER PUBLICATIONS

PCT/DE2015/000550, International Search report and Written Opinion, dated Mar. 21, 2016, 3 pages—English, 9 pages—German.

*Primary Examiner* — Robert John Sandy
*Assistant Examiner* — Michael S Lee
(74) *Attorney, Agent, or Firm* — Lackenback Siegel, LLP; Andrew F. Young

(57) ABSTRACT

A fixing and/or locking system for containers to a fastening device, in particular to a carrier, such as a luggage rack, wherein at least one fastening element is attached to the carrier or to an accessory part for the carrier and engages in and is detachably locked to at least one receiving element, which is attached to a container and/or is connected to the container, wherein the receiving element has a base plate having a spring-loaded slide, which runs between the base plate and a cover plate, wherein the cover plate has elevations having a through-hole from one side of the cover plate to the other, wherein the region for the spring-loaded slide is formed behind the one elevation and the space behind the other elevation has an undercut designed for the engagement of the protrusion or collar of a fastening element, wherein the spring-loaded slide presses a fastening element, which can be inserted into the through-hole, into a notch in the elevation of the cover plate and fastens it.

5 Claims, 3 Drawing Sheets

Figure 1:
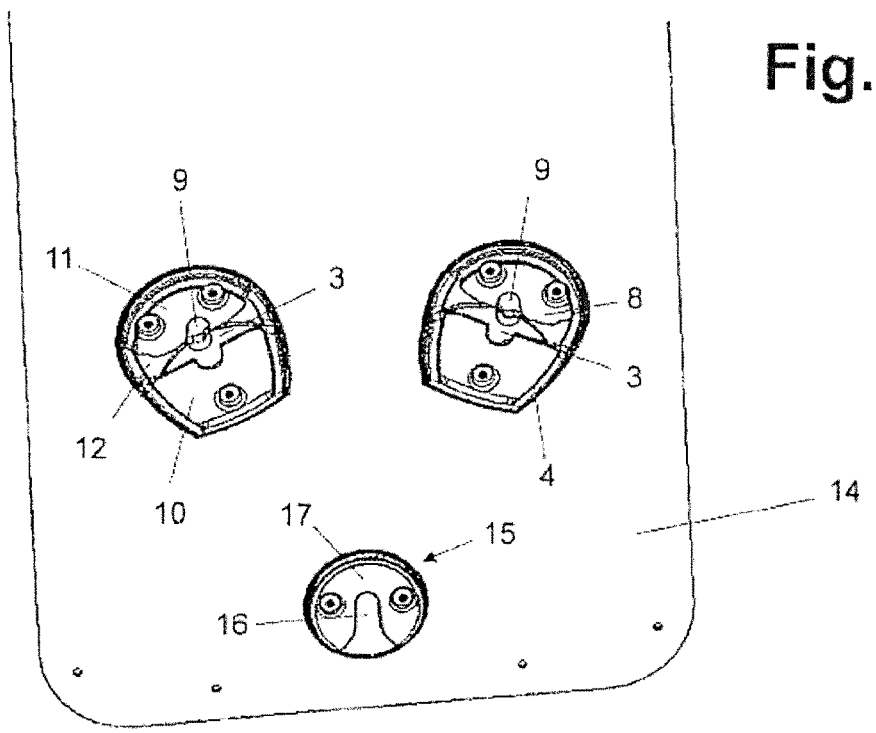

(51) Int. Cl.
*F16B 2/12* (2006.01)
*A45C 13/10* (2006.01)

(58) Field of Classification Search
CPC ... Y10T 24/45785; Y10T 24/13; A45C 13/10; A45C 2005/025; A45C 2005/026; A45C 2005/028; F16B 2/12
See application file for complete search history.

(56) References Cited

U.S. PATENT DOCUMENTS

| | | | | |
|---|---|---|---|---|
| 5,850,954 | A * | 12/1998 | Dong-Joo | H04M 1/04 224/197 |
| 5,919,623 | A * | 7/1999 | Taylor | C12N 15/102 204/456 |
| 2002/0005421 | A1 | 1/2002 | Campbell | |
| 2002/0158096 | A1* | 10/2002 | Wang | A45F 5/02 224/271 |
| 2003/0122002 | A1 | 7/2003 | Monson | |
| 2007/0107169 | A1* | 5/2007 | Kung | A44B 11/2573 24/308 |

FOREIGN PATENT DOCUMENTS

| | | |
|---|---|---|
| DE | 102011118867 | 5/2013 |
| DE | 102012012231 | 12/2013 |
| DE | 202013011432 | 1/2014 |

* cited by examiner

FASTENING AND/OR LOCKING SYSTEM

CROSS REFERENCE TO RELATED APPLICATIONS

This application relates to and claims priority from Ser. No. PCT/DE2015/000550 filed Nov. 19, 2015, the entire contents of which are herein incorporated by reference. This application in turn claims priority from DE App. Ser. No. 20 2014 009 305.9 filed Nov. 22, 2014.

DESCRIPTION

The invention at hand relates to a fixing and/or locking system for fastening containers to a fastening device, in particular to a carrier, such as a luggage rack, wherein at least one fastening element is attached to the carrier or to an accessory part for the carrier and engages in and is detachably locked to at least one receiving element, which is attached to a container and/or is connected to the container.

Various systems for carrying along containers, such as bags, suitcases, backpacks or the like, on a bicycle or generally on a carrier, are known for connecting or attaching, respectively, bags or other containers to the carrier, in particular luggage rack. Systems, in which the bags are fastened to a luggage rack in a detachable and simple manner, can be adjusted and removed again, are thereby particularly popular.

Such a design is disclosed, e.g. in DE 4041460A1, which shows a bag comprising a rail arranged on the rear side thereof, which is equipped with hooks, by means of which the bag can be hooked into the upper strut of a luggage rack. In innovations, such rails are embodied as snap-in or pivot hooks and lock the fastening. These alternatives also require very large, stable hooks or hooks comprising large deflections.

DE 202006017966U1 also shows an alternative for such a fastening of containers to a luggage rack, wherein two hooks are fixedly fastened to the rear side of the bag and by means of which the bag can be fastened to a luggage rack.

Carriers, in particular luggage racks, which are specifically prepared for this purpose and which have fixedly arranged fastening locations for containers, such as, e.g., bags, are also known as holding device for attaching containers. The WO 2006/086948A1 is to be named here as an example, in which a luggage rack is shown, which is equipped with fastening elements for attaching a container.

In innovations, the receiving points provided on the luggage rack for corresponding counter pieces on bags, are also embodied on a luggage rack as subsequently mountable elements, whereby not the entire luggage rack is required as accessory part.

In the case of the known systems, the bag or another container is fastened to a luggage rack by means of at least one receiving point, which is attached to the bag and which is engaged with at least one fastening point on a carrier or luggage rack, respectively. The used embodiments of receiving points or elements on bags are thereby hooks, which are attached to or placed onto the rear side of the bag and which can be engaged with elements on the luggage rack. Rails, which are attached to the rear side of the bag and which have at least one hook mechanism, by means of which the latter is attached to at least one fastening element on the luggage rack, are also known.

In the case of many fastening methods for attaching and fastening containers to a carrier, the necessity of having to hold the bag accurately above a plurality of locations in response to mounting and, while lowering the bag or the container, having to then simultaneously engage the receiving locations on the bag or on the container with the fastening locations on the carrier, with which they lock in place, is considered to be disadvantageous or uncomfortable to use. This is difficult for many users, in particular when the bag or the container is filled and thus has a higher weight and the holding of the high load in an exact position is very uncomfortable.

The handling when removing the bag or the container from a carrier is considered to be a further critical point of known fastening methods for attaching and fastening containers to a carrier, because, in addition to lifting the bag, an unlocking element must also be operated simultaneously hereby, which very often necessitates a handling with both hands.

It is the object of the invention at hand to create a holding device for attaching containers to a carrier, in particular for attaching storage bags or similar containers to a bicycle or to a luggage rack, respectively, which does not have the mentioned disadvantages. In particular the embodiment of bags, the rear of which is smooth or flat, respectively, is to be possible and the handling, in particular when mounting and removing the bag or the container from a luggage rack, is to be made easier.

This object is solved by means of the features of the characterizing part of claim 1. Further developments and advantageous embodiments of the invention are captured in the further claims.

A fixing and/or locking system for fastening containers to a fastening device, in particular to a carrier, such as a luggage rack, wherein at least one fastening element is attached to the carrier or an accessory part for the carrier and engages in and/or is detachably locked to at least one receiving element, which is attached to a container and/or is connected to the container, wherein the receiving element has a base plate having a spring-loaded slide, which runs between the base plate and a cover plate, wherein the cover plate has elevations and/or undercuts having a through-hole from one side of the cover plate to the other, wherein the region for the spring-loaded slide is formed behind the one elevation and the space behind the other elevation comprising its undercut is designed for the engagement of the protrusion or collar of a fastening element, wherein the spring-loaded slide presses a fastening element, which can be inserted into the through-hole, into a notch in the elevation of the cover plate and fastens it, is in accordance with the invention.

A mushroom-shaped fastening element, which is embodied on a carrier or fixedly attached or reversibly fastened to the carrier, can be connected to at least one receiving element of the bag or of the container by inserting the receiving element into the fastening element. The fastening element is introduced into the through-hole, which has at least one notch, wherein the elevations at this location are open to the rear and/or have an undercut. The mushroom-shaped fastening element thus engages behind these elevations with its enlarged cross section and creates a connection between the receiving element on the bag or the container and the fastening element on the carrier.

A notch, into which the spring-loaded slide guides the mushroom-shaped fastening element in response to the insertion, is embodied in a region in the cover plate of the receiving device and is guided and is fixed therein, due to the weight of the bag. The path of the notch is thereby preferably embodied so as to be curved, adapted to the movement of the bag in response to a lateral pivoting.

In addition to the weight of the bag, by means of which the lower receiving element of the bag is held on the preferably mushroom-shaped holding point and the upper receiving elements are held in the upper fastening elements in their notches, the spring-loaded slide in the upper receiving elements prevents a slide-out, jumping or detaching of the fastening means on the carrier from the receiving device. On its upper edge facing the upper cover plate of the receiving element, the spring-loaded slide is thus preferably embodied so as to be flat, whereby the upper edge of the slide still engages behind and fixes the enlarged circumference of a mushroom-shaped fastening means.

The spring-loaded slide, which runs in guide means between the base plate and the cover plate, is equipped with springs, which push the slide against contact points on and/or onto the base plate and/or cover plate, by means of which the fastening means is locked, e.g. to a luggage rack, by means of the receiving element.

The base plate of the receiving element is preferably fixedly connected to a bag body or a container, such as, for example, by welding and/or adhesion or is reversibly attached thereto in a secure manner. The cover plate comprising the described functional elements is replaceably or fixedly attached to the base plate and/or is connected thereto, for the purpose of which screw-connecting, riveting, clipping, inserting or also adhering and welding of the two parts can be used.

In the preferred embodiment of a fastening system comprising the receiving elements according to the invention, a bag is equipped with a lower guide element and two upper fixing and/or locking elements or receiving elements, respectively, wherein the lower one is thereby formed as guide element, for example comprising a slit, preferably comprising an undercut for receiving a mushroom-shaped fastening element.

A bag and/or container equipped in this manner can initially be inserted with its lower receiving element, which is equipped as guide, into a fastening means on a luggage rack, e.g., whereby the user is already unburdened from the weight of the bag. In this position, the bag can easily be pushed against the luggage rack and the upper fixing and/or locking elements are also brought in line with the fastening means on the luggage rack by laterally pivoting the bag. In the through-hole of the cover plate, the fastening means thereby glide along the upper edge, which is designed in a curve-shaped manner, to the notch in the upper elevation of the cover plate and is held against the weight of the bag at that location. Due to the enlarged diameter of the fastening means, which is preferably designed in a mushroom-shaped manner, the latter engages behind the elevations of the cover plate and secures the bag against falling out. The bag is prevented from jumping out, falling or detaching from this position by means of the spring-loaded slide.

Only the lifting of the bag pushes the spring-loaded slide to the side and/or downward and allows the enlarged diameter of the fastening means behind the undercut of the upper region of the cover plate to protrude, so that it is free. The bag can then be removed easily, for the purpose of which only a slight forward tilt is required.

The invention will be described below in more detail in an exemplary manner by means of drawings.

Figure 2:
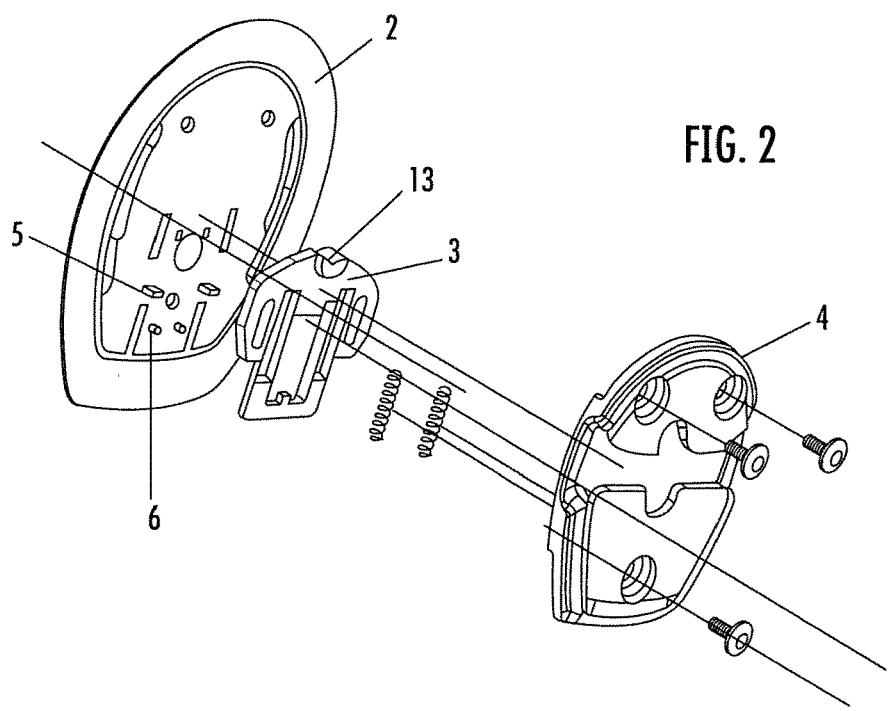
Figure 3:
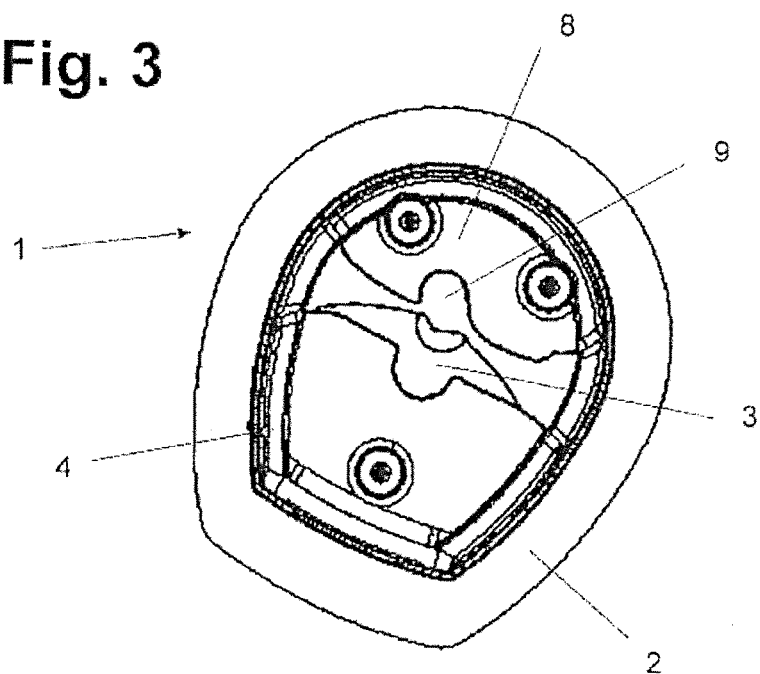
Figure 4:
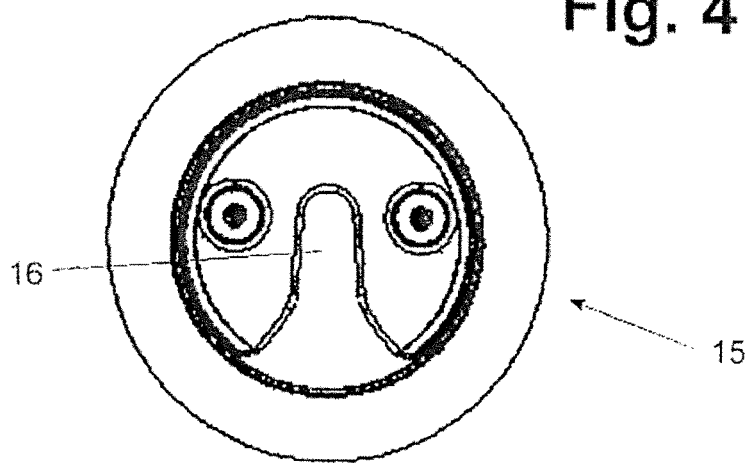
Figure 5:
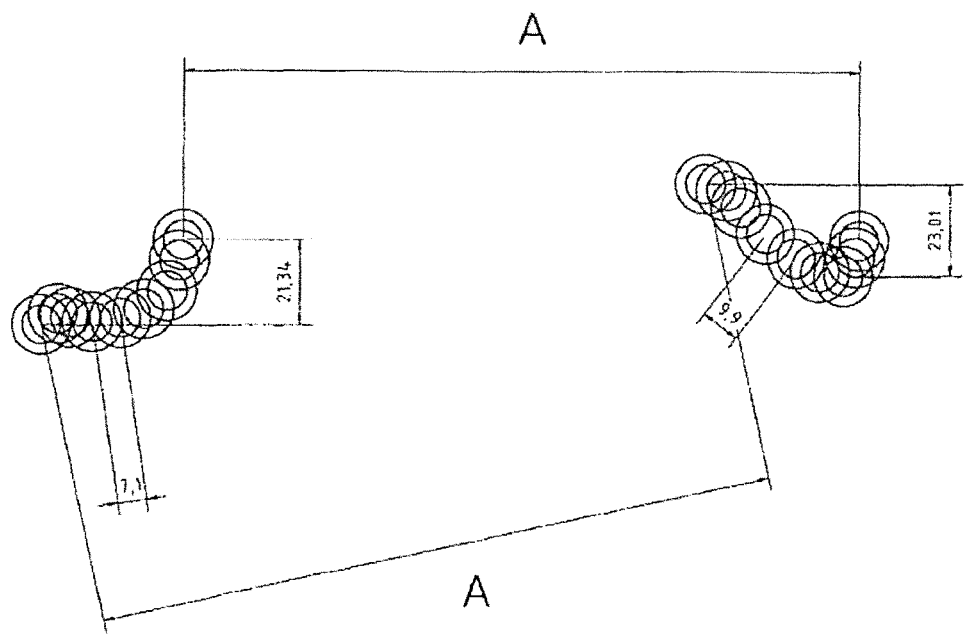

FIG. 1 shows a symbolically illustrated rear side of a bag comprising a fixing and/or locking system FIG. 2 shows an assembly drawing of a fixing and/or locking element FIG. 3 shows a front view of a fixing and/or locking element FIG. 4 shows a front view of a guide element FIG. 5 shows a schematic illustration of the path of movement in response to affixing a bag with the fixing and/or locking system FIG. 1 shows a fixing and/or locking system for detachably fastening a bag 14 or a container to a carrier, such as, e.g., a bicycle rack. In this embodiment, the symbolically illustrated bag 14 is equipped with two upper fixing and/or locking means or receiving elements 1, respectively, and a lower guide receptacle 15 having a middle part recess 16. The shown receiving elements and the guide element are preferably formed of one base body 2 and at least one cover plate 4, 17. The base plate 2 or the base body, respectively, is thereby preferably fixedly connected to the bag or the container 14, preferably fixedly connected in a water-tight manner, such as, for example, welded or adhered. To form a rear side of the bag or of the container, which is a flat as possible, the base body preferably protrudes slightly into the interior of the bag and/or of the container. The fixing and/or locking means is equipped with a cover plate 4, which has upper 11 and lower 10 hollowed-out, elevated partial regions, behind which a spring-loaded slide 3 is arranged with springs 7. According to the illustration of FIG. 1 and FIG. 2, the slide 3 is equipped with a head 13, which protrudes into a through-hole 12 of the cover plate between the upper and lower region. The two elevations 10, 11 have undercuts, with which the larger diameter of a mushroom-shaped fastening element engages in response to insertion, while the middle web enters with smaller diameter of the mushroom-shaped fastening means in the through-hole 12 between the elevations 10, 11 and strikes the spring-loaded slide.

In response to further insertion against the spring force of the slide, the latter is pushed downwards and the middle web of a mushroom-shaped fastening means is thereby pushed against the lower edge of the upper elevation 1. A notch 9 is arranged in the upper region 11 of the cover plate along this edge, preferably approximately in the middle of the distance along this edge, into which the middle web of the mushroom-shaped fastening means is guided and locked during the pivoting of the bag, guided through the spring-loaded slide 3 by the exerted force and due to the weight of the bag and/or of the container. The enlarged diameter of a mushroom-shaped fastening means is hereby held behind the wall of the upper region 11 and is held behind the surface of the upper region of the slide on the other hand, and is secured against forward movement.

According to a preferred embodiment, the notch 9 in the upper region 11 of the cover plate is not embodied so as to be straight, but is embodied with a preferred direction. More preferably, these notches for the two cover plates of a right and of a left fixing and/or locking means are directed in different preferred directions. The accidental detaching of the bag when attached to the luggage rack is thus also prevented effectively, because at least one of the receiving elements is always provided with a notch 9, which blocks in particular this pivoting in a particularly effective manner.

For intentionally removing the bag from a luggage rack, the bag is lifted upwards, the middle web of the mushroom-shaped fastening means thereby initially moves out of the notch 9, and the bag can be swung out laterally and can be removed in that the lower receiving means 15 is also pulled upwards out of the lower fastening means along the notch 16.

FIG. 5 illustrates the motion sequence of the upper receiving points when attaching and/or removing the bag and/or the container in an exemplary manner. While the actual distance A of the receiving points relative to one another remains the same in every position, the deflection of the receiving points, which sets in during the attachment and/or removing motion of the bag and/or of the container, is not identical.

Having described preferred embodiments of the invention with regard to the enclosed drawings, it is important to note that the invention is not limited to these exact embodiments and that different changes and modifications thereto can be made by a person of skill in the art, without deviating from the scope of the invention, as it is defined in the enclosed claims.

The invention claimed is:

1. A releasable fastening system, for releasable fastening between a supporting device and a supported device, comprising:
    at least one receiving element attached to said supported device and at least one fastening element attached to said supporting device;
    said receiving element, further comprising:
        a base plate having a back surface and front surface supporting a cover plate thereon;
        a spring-loaded slide member slidably retained between said base plate and said cover plate;
        at least a first and a second elevated portion on said cover plate projecting away from said front surface of said base plate and defining a throughgoing channel therebetween;
        said first and said second elevated portions extending from a proximate side to a distal side of said base plate;
        a receiving region bounded under said first elevated portion above said front surface of said base plate shaped to slidably receive said spring-loaded slide member;
        an undercut on said second elevated portion proximate said throughgoing channel and partially projecting over said throughgoing channel;
        said undercut of said second elevated portion shaped to engage a protrusion extending from said fastening element;
        a recess on said undercut on said second elevated portion proximate said throughgoing channel shaped to receive said protrusion extending from said fastening element; and
        said spring-loaded slide member urging said protrusion of said fastening element into said undercut and said recess during a use therewith.

2. The releasable fastening system, according to claim 1, wherein:
    said recess on said undercut having an arcuate shape defining a relatively small concave radius curve;
    said second elevated portion and said undercut having a relatively larger convex radius curve;
    said protrusion extending from said fastening element having a complementary shape to fit within said recess and said larger radius curve;
    said a spring-loaded slide member having a relatively flat flat upper edge facing said undercut and a relatively convex radius curve on a projecting surface facing said recess; and
    a central portion of said projecting surface of said spring-loaded slide having a concave portion.

3. The releasable fastening system, according to claim 2, further comprising:
    at least a first and a second engaging element projecting from said upper surface of said base plate and securing a respective first and a second spring element proximate said spring-loaded slide member;
    at least a first and a second guide element projecting from said upper surface of said base plate and respectively slidably received in a first and a second sliding channel in said spring-loaded slide member;
    whereby said spring-loaded slide member is slidably guided between a compressed position and an extended position during said use.

4. The releasable fastening system, according to claim 3, further comprising:
    a guiding element positioned proximate said at least one receiving element attached to said supported device;
    a recess in said guiding element having a concave arcuate receiving part; and
    said concave receiving part projecting away from said at least one receiving element.

5. The releasable fastening system, according to claim 4, further comprising:
    at least a second receiving element attached to said supported device; and
    said concave receiving part of said guiding element projecting away from said at least second receiving element.

* * * * *